(12) United States Patent
Grot et al.

(10) Patent No.: US 7,106,511 B2
(45) Date of Patent: Sep. 12, 2006

(54) IMAGING SYSTEM WITH LARGE DEPTH OF FIELD

(75) Inventors: Annette C. Grot, Cupertino, CA (US); Shalini Venkatesh, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/791,449

(22) Filed: Mar. 2, 2004

(65) Prior Publication Data

US 2005/0195483 A1 Sep. 8, 2005

(51) Int. Cl.
*G02B 5/18* (2006.01)
*H04N 9/04* (2006.01)
*G01J 3/28* (2006.01)

(52) U.S. Cl. .................. 359/566; 348/70; 348/269; 348/345; 396/333; 356/328

(58) Field of Classification Search .......... 359/565, 359/566, 569, 742; 369/112.12, 109; 382/164, 382/165; 384/191; 356/300, 305, 326, 310, 356/404–408, 418–421, 416, 4.03–4.05; 351/164; 348/70, 269, 345; 396/109–110, 396/333–334

See application file for complete search history.

(56) References Cited

U.S. PATENT DOCUMENTS

| 5,264,925 | A | * | 11/1993 | Shipp et al. ............. 348/269 |
| 5,523,786 | A | * | 6/1996 | Parulski ................ 348/269 |
| 5,526,338 | A | * | 6/1996 | Hasman et al. ........... 369/94 |
| 5,867,264 | A | * | 2/1999 | Hinnrichs ............... 356/310 |
| 6,693,672 | B1 | * | 2/2004 | Oliver .................. 348/345 |

FOREIGN PATENT DOCUMENTS

DE 20207170 * 8/2002

\* cited by examiner

*Primary Examiner*—Audrey Chang

(57) ABSTRACT

An optical imaging system and method for achieving a large depth of field without decreasing the relative aperture of an imaging lens. The imaging system has a light source for sequentially illuminating an object to be imaged with light of different ones of a plurality of wavelengths, and an imaging lens that has a focal length that varies with the wavelength of the light that illuminates the object. For each wavelength of light by which the object is illuminated, the imaging lens will image a different object plane onto an image receiving unit, and the image receiving unit will capture one well-focused, high resolution image of the object.

21 Claims, 1 Drawing Sheet

IMAGING SYSTEM WITH LARGE DEPTH OF FIELD

BACKGROUND OF THE INVENTION

1. Technical Field of the Invention

The present invention relates generally to the field of imaging systems. More particularly, the invention relates to an imaging system and method for achieving a large depth of field without decreasing the relative aperture of an imaging lens.

2. Background of Invention

A large depth of field is important in imaging systems having an imaging lens position that is fixed with respect to an image receiving surface, but in which the distance along the optical axis from the lens to the object to be imaged may vary significantly. In a typical imaging system, depth of field is inversely proportional to the relative aperture of the imaging lens such that the relative aperture of the lens must be decreased in order to increase the depth of field. Decreasing the relative aperture, however, reduces light sensitivity and resolution; and, as a result, it is difficult to design an imaging system that has a large depth of field while maintaining high light sensitivity and fine resolution.

There is, accordingly, a need for an imaging system that achieves a large depth of field without decreasing the relative aperture of an imaging lens.

SUMMARY OF THE INVENTION

In accordance with the invention, an optical imaging system and method is provided for achieving a large depth of field without having to decrease the relative aperture of an imaging lens.

An imaging system in accordance with the invention has a light source for sequentially illuminating an object to be imaged with light of different ones of a plurality of wavelengths, and an imaging lens that has a focal length that varies with the wavelength of the light that illuminates the object. For each wavelength of light by which the object is illuminated, the imaging lens will image a different object plane onto an image receiving unit. If the object remains substantially stationary while the light source is being tuned to the different wavelengths, and if the wavelength range and the design of the imaging lens are chosen appropriately for possible object distance variation, the image receiving unit will capture one well-focused, high resolution image of the object.

DETAILED DESCRIPTION OF THE EXEMPLARY EMBODIMENTS OF THE INVENTION

Embodiments in accordance with the invention provide an imaging system and method for achieving a large depth of field without having to decrease the relative aperture of an imaging lens.

Figure 1:
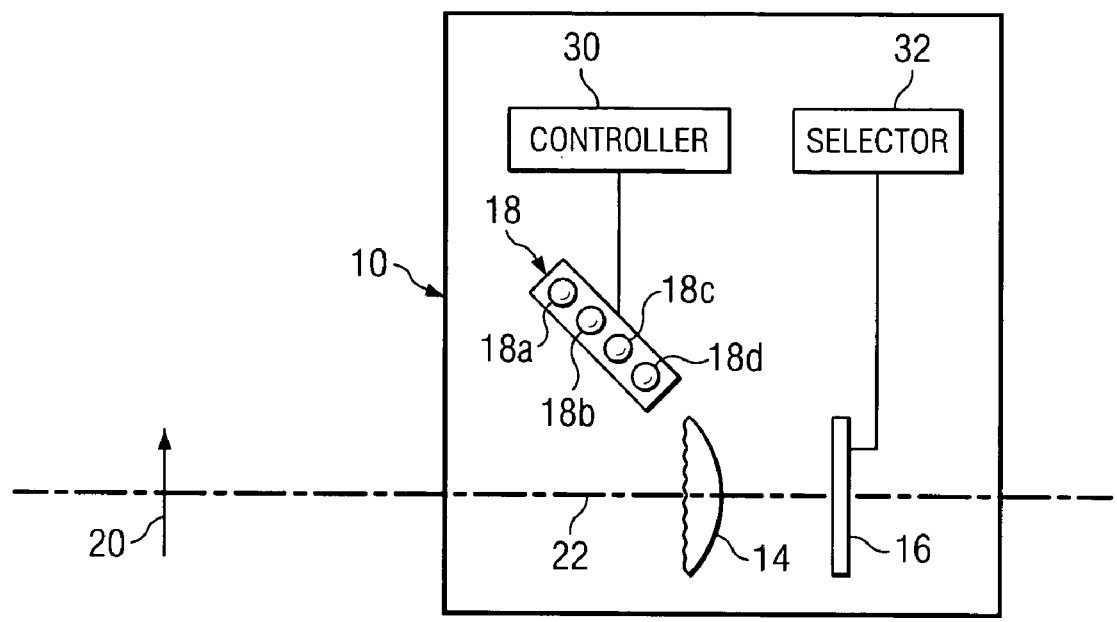
FIG. 1 schematically illustrates an imaging system according to an exemplary embodiment of the invention.

FIG. 1 schematically illustrates an imaging system according to an exemplary embodiment in accordance with the invention. The system is generally designated by reference number 10 and has imaging lens 14 for forming an image of an object 20, image receiving unit 16 for receiving the image formed by imaging lens 14, and light source 18 for illuminating object 20 during an image forming operation. In the exemplary embodiment illustrated in FIG. 1, imaging system 10 is a digital camera, for example, a digital still camera; however, the invention is not limited to any particular type of camera. Also, in the exemplary embodiment illustrated in FIG. 1, light source 18 is incorporated in the camera, however, light source 18 and the camera can also be separate components of imaging system 10.

Imaging lens 14 has a focal length that varies inversely with the wavelength of the light that illuminates the object being imaged during an imaging operation. Thus, for each wavelength of light by which object 20 is illuminated, imaging lens 14 will image a different object plane onto image receiving unit 16. It should be understood that the term "varies inversely" as used herein means that the focal length of the imaging lens increases when the wavelength of the light that illuminates the object decreases, and decreases when the wavelength of the light that illuminates the object increases. The term is not intended to imply that there is a strict mathematical inverse proportionality between focal length and wavelength. In addition, it should be understood that although, in the exemplary embodiments described herein, the imaging lens has a focal length that varies inversely with the wavelength of the light that illuminates the object, the focal length may also vary in other ways relative to wavelength, for example, the focal length may increase as the wavelength increases; and the invention is not limited to any particular manner in which the focal length of the imaging lens varies with the wavelength of the light that illuminates the object.

In the exemplary embodiment illustrated in FIG. 1, imaging lens 14 is a combined refractive/diffractive lens having both refractive and diffractive properties. In particular, for a diffractive lens, the focal length ($f_{diff}$) is inversely proportional to wavelength ($\lambda$) as follows:

$$f_{diff} = f_0/\lambda \quad (1)$$

For a combined refractive/diffractive lens that has both refractive and diffractive properties, however, the focal length ($f_{ref}$) of the refractive component and the focal length ($f_{diff}$) of the diffractive component are combined as follows:

$$1/f = 1/f_{ref} + 1/f_{diff} \quad (2)$$

As will be discussed hereinafter, with a properly designed combined refractive/diffractive lens, a well-focused image of an object can be formed by illuminating an object with light of only a few, for example, 3–5, different wavelengths within an appropriate range of wavelengths. In accordance with further exemplary embodiments of the invention, imaging lens 14 can also be a diffractive lens or a refractive lens formed of a dispersive material (a material that changes with wavelength), and can be formed of a single lens or a plurality of lenses, and the invention is not limited to any particular imaging lens.

Light source 18 is a wavelength-tunable light source capable of illuminating object 20 with light of a plurality of different wavelengths. In the exemplary embodiment illustrated in FIG. 1, light source 18 comprises a plurality of separate light sources 18a, 18b, 18c and 18d, each providing light of a different wavelength, although other light sources capable of providing light of different wavelengths can also be used and the invention is not limited to any particular light source.

In the exemplary embodiment illustrated in FIG. 1, separate light sources 18a–18d are light emitting diodes (LEDs), each providing light of a different wavelength. Separate light sources 18a–18d can also be laser diodes or blue LEDs having different phosphors on top of the LEDs to produce different wavelengths, and the invention is not limited to any particular separate light sources. It should also be noted that although LEDs are incoherent sources, they are sufficiently narrow in spectral width for use in imaging system 10.

Image receiving unit 16 is a photosensor array together with appropriate electronics for converting analog photosensor outputs into digital data. In the exemplary embodiment illustrated in FIG. 1, image receiving unit 16 comprises a CMOS (Complementary Metal Oxide Semiconductor) detector array, although other image receiving units such as a CCD (Charge-Coupled Device) detector array may also be used, and the invention is not limited to any particular image receiving unit. Image receiving unit 16 is positioned behind imaging lens 14 relative to object 20 being imaged such that an image of the object formed by imaging lens 14 will be imaged onto image receiving unit 16.

As shown in FIG. 1, image receiving unit 16 and object 20 are positioned on optical axis 22 of imaging lens 14. The distance between imaging lens 14 and image receiving unit 16 is assumed to be fixed; however, the distance between imaging lens 14 and object 20 (the object distance) may vary. It is assumed, however, that the object remains substantially stationary during a particular imaging operation.

In an imaging operation, light sources 18a–18d are turned on and off one at a time in sequence by controller 30; and image receiving unit 16 captures an image of object 20 each time the object is illuminated by one of the light sources. If the wavelength range of the light sources and the design of the imaging optics are chosen appropriately for the possible variation in object distance, one of the images captured by image receiving unit 16 will comprise a well-focused, high resolution image of the object.

In an exemplary embodiment of the invention, object 20 comprises the iris of a person's eye. Such an imaging application may involve a variation in object distance of from about 5 inches to about 20 inches. For such an application, light sources 18a–18d can comprise commercially available LEDS having different wavelengths in the wavelength range of from about 450 nm to about 980 nm. With an imaging lens having a diffractive component only, this wavelength range will produce a change of over 2× in the focal length of the lens. With a combined refractive/diffractive lens as the imaging lens, the lens will not have to change its focal length by such a large factor. For example, if the refractive surface power is designed to be suitable for forming a well-focused image of an object positioned at about the middle of the anticipated object distance range, the combined lens would only have to change its focal length by about 1.14×, and this can be readily achieved by choosing only a few, for example, 3–5 different LED wavelengths in the 450 nm to 980 nm wavelength range.

Selection of the best image among the plurality of formed images, i.e., the image that is most sharply focused, is accomplished by selector 32. Selection can be accomplished in various ways. One selection procedure comprises a passive autofocus procedure in which the intensity among adjacent pixels of the formed images is examined. For images that are out-of-focus, adjacent pixels will have similar intensities. The image that provides the maximum intensity difference between adjacent pixels will be the image that is most in-focus and that is selected by the selector. In another selection procedure, Fourier transforms of the formed images are taken, and the image with the highest frequency component is the image that is most in-focus. In general, procedures for selecting a sharply focused image are well-known in the art and need not be described in any detail herein, and the invention is not limited to any particular selection procedure.

Figure 2:
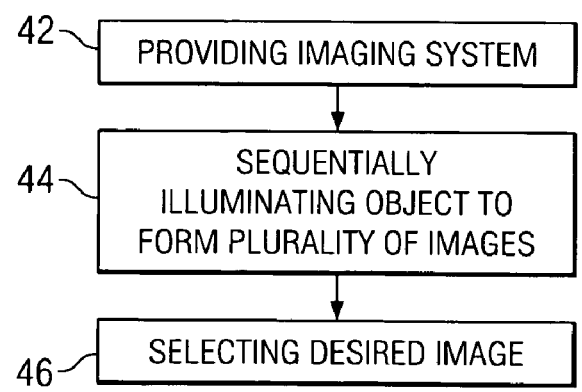
FIG. 2 is a flow chart that illustrates a method for providing a desired image of an object according to another exemplary embodiment of the invention.

FIG. 2 is a flow chart that illustrates a method in accordance with the invention for providing a desired image of an object according to an exemplary embodiment of the invention. The method is generally designated by reference number 40 and begins by providing an imaging system that includes a wavelength-tunable light source for illuminating an object to be imaged, and an imaging lens having a focal length that varies inversely with the wavelength of the light that illuminates the object (step 42). The object is then sequentially illuminated with light of different ones of a plurality of wavelengths to form a plurality of images on an image receiving unit (step 44). The light source is preferably operated at a rate consistent with the time required for the image receiving unit to process each image. Typically, the plurality of images can be formed at video speeds of 60 images/second. In general, it is desirable to form the images as fast as possible so as to minimize any movement of the object during the imaging operation. The image among the plurality of images that is in best focus is then selected to provide one well-focused, high resolution image of the object (step 46).

While what has been described constitutes exemplary embodiments of the invention, it should be recognized that the invention can be varied in many respects without departing therefrom. For example, although exemplary embodiments described herein provide a well-focused image of the iris of an eye, the invention can be used in other biometric applications, such as providing a well-focused image of a fingerprint; and in numerous other applications wherein the object distance may vary. Among such other applications include applications involving triggered surveillance of a defined space. For example, an entomologist can set up an unattended imaging system to be triggered by an insect that enters a defined space along and around the optical axis of the imaging system, but not at any specific object distance. The imaging system will then capture a series of images, one of which is selected for best focus. In another application, an imaging system can be provided on a robot to provide well-focused images of nearby objects to assist the robot in moving around. In a further application, an imaging system can be used by a consumer to record images of valuable possessions to provide an inventory for insurance purposes and the like without it being necessary to remove the possessions from their normal positions within the home. In addition, although exemplary embodiments described herein describe forming an image of an object having an object distance that may vary from between about 5 inches to about 20 inches, the invention can also be used to capture a well-focused image of an object within other object distance ranges, and the invention is not limited to any particular object distance range. Because the invention can be varied in many ways, it should be understood that the invention should be limited only insofar as is required by the scope of the following claims.

We claim:

1. An imaging system, comprising:
   an imaging optics for forming an image of an object at an object distance that may vary within an object distance range, said imaging optics having a focal length that varies with wavelength of light that illuminates the object;
   an image receiving unit for receiving an image of said object formed by said imaging optics;
   a light source for sequentially illuminating said object with light of different ones of a plurality of wavelengths for providing a plurality of images of said object received by said image receiving unit; and
   a processor for selecting a desired image among said plurality of received images.

2. The imaging system according to claim 1, wherein said imaging optics has a focal length that varies inversely with a wavelength of light that illuminates the object.

3. The imaging system according to claim 2, wherein said imaging optics comprises a combined refractive/diffractive lens.

4. The imaging system according to claim 2, wherein the object distance range comprises from about 5 inches to about 20 inches, and wherein said plurality of wavelengths comprise a plurality of wavelengths between about 450 nm and about 980 nm.

5. The imaging system according to claim 4, wherein said object comprises an iris of an eye.

6. The imaging system according to claim 4, wherein said object comprises a fingerprint.

7. The imaging system according to claim 1, wherein said image receiving unit comprises an array of photosensors.

8. The imaging system according to claim 7, wherein said array of photosensors comprises a CMOS detector array.

9. The imaging system according to claim 1, wherein said light source comprises a plurality of separate light sources, each of said plurality of separate light sources illuminating said object with light of a different wavelength.

10. The imaging system according to claim 9, wherein said plurality of separate light sources comprises a plurality of light emitting diodes.

11. The imaging system according to claim 9, wherein said plurality of separate light sources comprises from about three to about five light sources.

12. The imaging system according to claim 1, wherein said desired image comprises a best-focused image among said plurality of received images.

13. The imaging system according to claim 1, wherein said imaging system comprises a digital still camera.

14. A method for providing a desired image of an object, comprising:
   sequentially illuminating an object at an object distance that may vary within an object distance range with light of different ones of a plurality of wavelengths forming a plurality of images of said object with an imaging system having a focal length that varies with a wavelength of the light that illuminates the object; and
   selecting a desired image among said plurality of formed images.

15. The method according to claim 14, wherein said selecting comprises selecting a best-focused image among said plurality of formed images.

16. The method according to claim 14, wherein sequentially illuminating an object at an object distance that may vary within an object distance range with light of different ones of a plurality of wavelengths comprises sequentially illuminating said object with light of a plurality of separate light sources, each of said plurality of separate light sources illuminating said object with light of a different wavelength.

17. The method according to claim 14, wherein forming a plurality of images of said object with an imaging system having a focal length that varies with a wavelength of the light that illuminates the object comprises forming a plurality of images of said object with an imaging system having a focal length that varies inversely with a wavelength of the light that illuminates the object.

18. The method according to claim 17, wherein the object distance range comprises from about 5 inches to about 20 inches, and wherein said plurality of wavelengths comprise a plurality of wavelengths between about 450 nm and about 980 mm.

19. The method according to claim 14, wherein forming a plurality of images of said object with an imaging system having a focal length that varies with a wavelength of the light that illuminates the object comprises forming said plurality of images on a photosensor array.

20. The method according to claim 14, wherein sequentially illuminating an object at an object distance that may vary within an object distance range with light of different ones of a plurality of wavelengths comprises sequentially illuminating said object at a rate of 60 images per second.

21. The method according to claim 14, wherein said imaging system comprises a digital still camera.

* * * * *